(12) United States Patent
Klabunde et al.

(10) Patent No.: US 9,002,263 B2
(45) Date of Patent: Apr. 7, 2015

(54) SWITCHING BETWEEN MULTIPLE COUPLING MODES

(75) Inventors: Karin Klabunde, Eindhoven (DE);
Steven Corroy, Eindhoven (FR);
Heribert Baldus, Eindhoven (NL);
Francesco Gallo, Hamburg (DE)

(73) Assignee: Koninklijke Philips N.V., Eindhoven (NL)

( * ) Notice: Subject to any disclaimer, the term of this patent is extended or adjusted under 35 U.S.C. 154(b) by 422 days.

(21) Appl. No.: 12/808,453

(22) PCT Filed: Dec. 17, 2008

(86) PCT No.: PCT/IB2008/055385
§ 371 (c)(1),
(2), (4) Date: Jun. 16, 2010

(87) PCT Pub. No.: WO2009/081337
PCT Pub. Date: Jul. 2, 2009

(65) Prior Publication Data
US 2010/0311326 A1 Dec. 9, 2010

(30) Foreign Application Priority Data
Dec. 20, 2007 (EP) .................................... 07123763

(51) Int. Cl.
*H04B 5/00* (2006.01)
*H04B 13/00* (2006.01)

(52) U.S. Cl.
CPC ............ *H04B 13/005* (2013.01); *H04B 5/0031* (2013.01); *H04B 5/0081* (2013.01); *H04B 5/0012* (2013.01); *H04B 5/0018* (2013.01)

(58) Field of Classification Search
USPC ........................................................ 455/41.1
See application file for complete search history.

(56) References Cited

U.S. PATENT DOCUMENTS

| | | | | |
|---|---|---|---|---|
| 5,371,739 A * | 12/1994 | Knapczyk | ..................... | 370/449 |
| 5,678,202 A | 10/1997 | Filimon et al. | | |
| 6,577,229 B1 * | 6/2003 | Bonneau et al. | ........... | 340/10.41 |
| 6,992,565 B1 | 1/2006 | Giesler | | |
| 7,082,316 B2 | 7/2006 | Eiden et al. | | |
| 7,171,177 B2 * | 1/2007 | Park et al. | ................... | 455/188.1 |
| 7,711,323 B2 * | 5/2010 | Fujii | ............................. | 455/41.1 |
| 7,777,719 B2 * | 8/2010 | Zhao | ............................. | 345/156 |
| 2004/0152440 A1 | 8/2004 | Yoda et al. | | |
| 2004/0219890 A1 * | 11/2004 | Williams et al. | .............. | 455/100 |

(Continued)

FOREIGN PATENT DOCUMENTS

| | | |
|---|---|---|
| EP | 1220501 A2 | 7/2002 |
| GB | 2422517 A | 7/2006 |

(Continued)

*Primary Examiner* — Gennadiy Tsvey

(57) ABSTRACT

A device for transmitting in multiple coupling modes has a transmission module (11), at least one periphery module (18), and an antenna (16, 17) for each of the multiple coupling modes. Further, in a method of switching between multiple coupling modes, switching is conducted between at least polling and listening phases of first and second coupling modes. The device and the method enable a seamless switching between e.g. a near field communication and a body coupled communication. Such a coupling or switching is particularly useful for performing secure transactions whereby through body coupled communication a body-worn tag is interrogated which provides a secure code for a transaction initiated through near field communication with a transaction terminal.

8 Claims, 2 Drawing Sheets

·········▶ Example of switch between NFC and BBC
———▶ BCC Polling and Listen Phase

(56) References Cited

U.S. PATENT DOCUMENTS

| | | | |
|---|---|---|---|
| 2004/0248529 A1* | 12/2004 | Park | 455/127.1 |
| 2007/0026826 A1* | 2/2007 | Wilson | 455/130 |
| 2007/0182578 A1* | 8/2007 | Smith | 340/669 |
| 2008/0238610 A1* | 10/2008 | Rosenberg | 340/5.7 |
| 2009/0023391 A1* | 1/2009 | Falck | 455/41.2 |
| 2009/0135760 A1 | 5/2009 | Urushihara et al. | |
| 2009/0189769 A1* | 7/2009 | Schaffler et al. | 340/572.7 |

FOREIGN PATENT DOCUMENTS

| | | |
|---|---|---|
| JP | 2002525702 A | 8/2002 |
| JP | 2002261702 A | 9/2002 |
| JP | 2007116672 A | 5/2007 |
| JP | 2009535959 A | 10/2009 |
| WO | WO 0167413 A * | 9/2001 |
| WO | 2007129252 A1 | 11/2007 |

\* cited by examiner

----▶ Example of switch between NFC and BBC
——▶ BCC Polling and Listen Phase

SWITCHING BETWEEN MULTIPLE COUPLING MODES

FIELD OF THE INVENTION

The present invention relates to a device and a method for switching between multiple coupling modes.

BACKGROUND OF THE INVENTION

Up to now the need and the desire for communication has steadily increased and has now reached an extent such that communication means are ubiquitous in today's life and society. Further, among various communication possibilities, wireless communication has established itself as an option for day-to-day communication needs that is equal to, if not in some cases superior over, wired communication solutions. With wireless communication any distance from several hundreds of kilometers to millimeters can be bridged, depending on the technique and transmitting power used.

In recent years different methods for communication over short ranges, e.g. several centimeters, as well as different methods for communication over ranges up to several meters have been extensively investigated.

For example, a combination of smart cards and radio frequency identification (RFID) tags is widely used in various fields such as transport (ticketing, road tolling, baggage tagging), finance (debit and credit cards, electronic purse, merchant card), communications (SIM card for GSM phone), and tracking (access control, inventory management, asset tracking). In electronic ticketing for public transport, for example, a traveller just waves his/her card over a reader at a turnstile or entry point. The RFID tag of the card is coupled to the reader, and a respective fare is deducted from the card.

Another example of a method for communication over short ranges is body coupled communication (BCC). BCC is a wireless technology that allows electronic devices on and near the human body (up to about 15 cm) to exchange digital information through near-field electrostatic coupling. Information is transmitted by modulating electric fields and electrostatically (capacitively) coupling picoamp currents into the body. The body conducts the tiny currents to body mounted receivers. The environment (the air and earth ground) provides a return path for a transmitted signal.

A further example of a communication method for short ranges is near field communication (NFC), wherein a short-distance communication via networking technology is established between two devices that are not physically connected. Such devices can communicate with each other either peer-to-peer or on a client-server basis. NFC is optimised for easy and secure communications between various devices, e.g. mobile phones, without user configuration. In order to make two devices communicate, users bring them close together or even make them touch. The devices' NFC interfaces will automatically connect and configure themselves to form e.g. a peer-to-peer network. NFC can also bootstrap other protocols like Bluetooth™ or Wireless Ethernet (WiFi) by exchanging the configuration and session data.

However, NFC has two severe limitations. On the one hand, the communication range is limited to about 10-20 cm, which is not always sufficient to perform a desired action. Therefore, it is always necessary to bring a NFC enabled device close to a respective reading terminal. On the other hand, in view of the communication range, financial or other security critical transactions are insecure, as eavesdropping of the communication is possible.

SUMMARY OF THE INVENTION

It is therefore an object of the present invention to provide a device and a method, by means of which the above and other shortcomings in short-range communications, especially in near field communications, can be alleviated.

Accordingly, in a first aspect of the present invention a device for transmitting in multiple coupling modes is proposed, comprising: a transmission module, at least one periphery module, and an antenna for each of the multiple coupling modes.

The device enables to combine near field communication with body coupled communication. The integration of the two technologies allows a seamless switching between inductive coupling and capacitive coupling using a single hardware based on cooperation at a low protocol level. In other words, a device configured to operate in a near field communication network and in a body coupled communication network can be provided.

The proposed device is advantageous, as body coupled communication coverage is the whole body, i.e. a device can stay in the pocket and a communication with another device is possible as soon as a user touches it. Further, combining a mobile near field communication transaction with an authentication procedure using body coupled communication makes this transaction secure, since due to the very short communication range eavesdropping is almost impossible.

The at least one periphery module of the proposed device can comprise a receiver circuit, a filter, and a matching module. The matching module can comprise at least one matching circuit for at least one of the multiple coupling modes. A different matching circuit for each coupling mode might be favourable, as interference effects can be reduced in this case.

The at least one periphery module may be configured for each of the multiple coupling modes by comprising: a receiver circuit for each of the multiple coupling modes, a filter for each of the multiple coupling modes, and a matching circuit for each of the multiple coupling modes. This configuration is advantageous, as the respective signal path through the periphery module can be optimized for a corresponding coupling mode.

A first coupling mode can be an inductive coupling mode, and a second coupling mode may be a capacitive coupling mode. An inductive coupling mode can be used for near field communication, and a capacitive coupling mode may be used for body coupled communication. Additionally, the transmission module and the at least one periphery module can be integrated in a single module.

The proposed device can be used in a mobile phone.

In a further aspect of the present invention a method of switching between multiple coupling modes is proposed, wherein switching is conducted between at least polling and listening phases of first and second coupling modes.

The method enables to combine near field communication with body coupled communication. This is advantageous, as body coupled communication coverage is the whole body, i.e. a device can stay in the pocket and a communication with another device is possible as soon as a user touches it. Further, combining a mobile near field communication transaction with an authentication procedure using body coupled communication makes this transaction secure, since due to the very short communication range eavesdropping is almost impossible.

With the proposed method, the switching may be conducted periodically. The first coupling mode can be an inductive coupling mode, and the second coupling mode may be a capacitive coupling mode. The inductive coupling mode can be used for near field communication, and the capacitive coupling mode may be used for body coupled communication. In the polling phase of the inductive coupling mode one or more of multiple inductive coupling mechanisms can be polled, and in the listening phase of the inductive coupling mode answers from multiple inductive coupling mechanisms may be received.

Further, the listening phase and the polling phase of at least one of the first and second coupling modes can occur alternatively. The time of the polling phase and the listening phase of the first coupling mode can equal the time of the polling phase and the listening phase of the second coupling mode.

The proposed method can be implemented as a computer program that can be run on a computer and stored on a machine-readable medium of a computer program product.

The proposed solution enables applications operating with two different communication media having different advantages and usage patterns, and different physical propagation behaviour using a single hardware. It is compatible to both, existing applications for inductive coupling modes and existing applications for capacitive coupling modes, granting the full benefits of near field communication and body coupled communication to one device.

Additionally, the device allows to realize new applications using only body coupled communication, only near field communication, or body coupled communication and near field communication. Especially the last option allows the development of applications and services using both technologies, which would not be possible using either one technology alone or both technologies in parallel on two different devices.

The proposed solution is also compatible to other near field communication solutions as well as to other body coupled communication solutions.

Additionally, with the proposed solution, existing near field communication applications can be easily extended to use body coupled communication. Thus, the field of use for body coupled communication may be expanded.

Further, with respect to other devices in a network, a device according to the proposed solution can operate in both a near field communication network and a body coupled communication network as if it was a normal device. Accordingly, a mode switch between the different technologies (near field communication/body coupled communication) offers transparency of the multi-technologies capability in accordance with the proposed solution. Thus, simple near field communication or body coupled communication applications may operate normally when communicating with the device provided with the multi-technologies capability.

Additionally, usage of the same hardware allows synchronization of near field communication media and body coupled communication media on a low layer, e.g. layer 2 of the open system interconnection (OSI) seven layer model, and sharing of a software stack on the device for both technologies. As the amount of needed code for applications is reduced, it leads to an easier and better code development and maintainability. Such a low-level synchronization of the two communication modes at a low layer speeds up applications and does not affect user experience.

The abstraction level of the software stack allows completely generic functions like "polling" (which will be a polling of near field communication and body coupled communication devices resulting in a list of all devices present on both networks), but does not prevent specific applications from performing functions only related to one technology.

As the device either operates in the inductive coupling mode or the capacitive coupling mode at a specific point in time, no interference between these two modes can happen. Additionally, no shielding has to be implemented between the respective modules to decrease any interference. Accordingly, the data rate of the device can be increased as any retransmission rate of the device can be decreased.

An advantage of the proposed solution is that the power is only consumed by one device and the power is managed in a centralized manner, so that there is no waste of power when using the two technologies.

Further advantageous developments are defined in the dependent claims.

BRIEF DESCRIPTION OF THE DRAWINGS

The present invention will now be described on the basis of an embodiment with reference to the accompanying drawings, in which.

DETAILED DESCRIPTION OF AN EMBODIMENT

Figure 1:
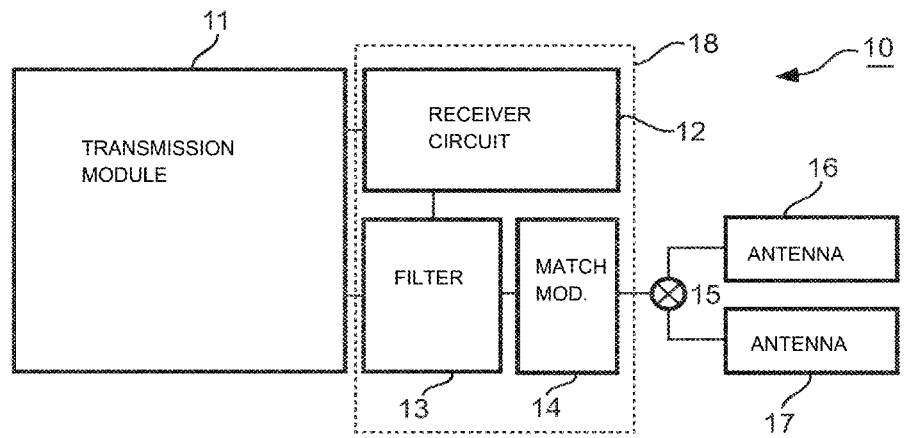
FIG. 1 shows a schematic configuration of an exemplary device according to the embodiment.

FIG. 1 shows a schematic configuration of a device, i.e. a hardware module 10, according to an embodiment. A transmission module 11 performs a generation of a transmitted signal. This signal can be an authentication signal, a session signal or a data signal. The transmission module 11 can be coupled to any sending device, requesting device and/or receiving device. In the exemplary hardware module 10 depicted in FIG. 1, the transmission module 11 is connected to a receiver circuit 12. The receiver circuit 12 provides a received signal to an internal receiving stage of the transmission module 11. A filter 13 is connected to the transmission module 11 and to the receiver circuit 12. The filter 13 is configured to reduce the harmonics of the transmitted signal and perform an impedance transformation, if necessary. The filter 13 can be an electromagnetic compatibility (EMC) filter or any other filter capable of reducing harmonics and/or impedance transformation. In the exemplary hardware module 10 depicted in FIG. 1, the filter 13 is an EMC filter. A matching module or matching circuit 14 is connected to the EMC filter 13. The matching circuit 14 acts as an impedance transformation block. It can comprise one matching circuit for every one of multiple coupling modes or one matching circuit for any number of the multiple coupling modes, e.g. one matching circuit for two coupling modes. For example, the matching circuit 14 may comprise at least two separate matching circuits (capacitive/inductive). The matching circuit 14 is connected to a mixer 15. Additionally, a capacitive antenna 16 for generating an electric field and receiving body coupled communication (BCC) packets as well as an inductive antenna 17 for generating a magnetic field and receiving near field communication (NFC) packets are connected to the mixer 15. Reference numeral 18 denotes a periphery module comprising the receiver circuit 12, the EMC filter 13 and the matching circuit 14.

The transmission module 11 and the periphery module 18 can be integrated in a single module. It is also possible to use different configurations of transmission modules and periphery modules within the same device. Depending on the different configurations, a common module for an inductive coupling mode and a capacitive coupling mode or a separate module for any one of the coupling modes, NFC technology and BCC technology can cooperate with each other sharing common software and hardware at different protocol levels. The inductive coupling mode can be used for NFC, and the capacitive coupling mode may be used for BCC.

Using the two technologies on two different devices, the cooperation can be done at a high protocol level, usually in software inside an apparatus that hosts the two devices. On the other hand, using the two technologies on the same device or integrated circuit (IC), the cooperation can also be done at a low protocol level, usually in firmware or even in hardware inside the device or the IC itself.

The integration of the two technologies allows a seamless switching between inductive coupling and capacitive coupling using a single hardware based on cooperation at a low protocol level.

The device or hardware module 10 can be integrated into e.g. a mobile phone, a smart phone, a personal digital assistant, a smart card, a credit card, a multimedia player, a watch, a key, a handheld computer and/or a laptop computer. Additional applications using only inductive coupling modes, only capacitive coupling modes, or inductive and capacitive coupling modes can be realized. Especially the latter option allows developing applications which use the two technologies, and offers services that could not be implemented using one single technology or using the two technologies in parallel on two different devices.

Figure 2:
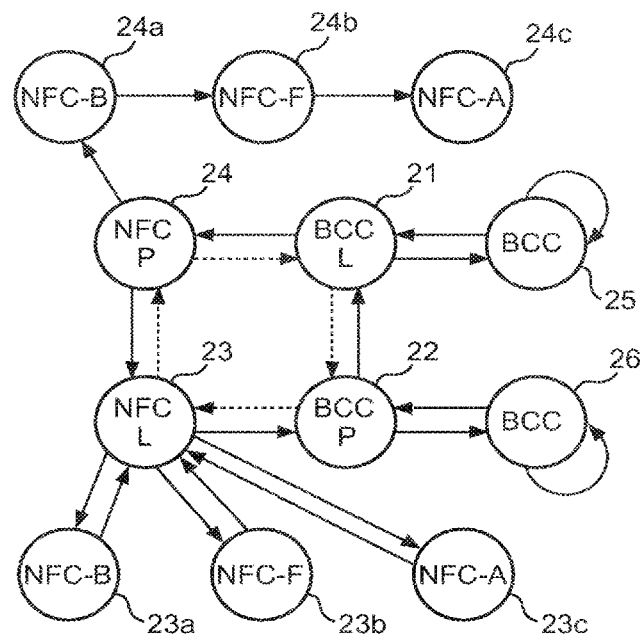
FIG. 2 shows a finite state automaton of a mode switch module according to the embodiment.

In FIG. 2 a finite state automaton of a mode switch module is shown. Each NFC/BCC device contains a module 'mode switch'. Preferably, the mode switch module is realised in software. However, a realisation in hardware is also possible. The mode switch module enables a seamless switching between a NFC mode and a BCC mode. This procedure enables a good rotation time between a NFC polling and listening and a BCC polling and listening. In the NFC mode, the device has to poll and listen for the three different types of NFC devices (NFC-B, NFC-F and NFC-A). In the BCC mode, the device polls and listens for BCC devices.

In the NFC mode, the device polls for e.g. the following kinds of devices grouped by applied technology:
  NFC-A: ISO/IEC14443 Type A card compliant, Mifare Card and NFC Phone emulating a card (e.g. Nokia 6131 NFC)
  NFC-B: ISO/IEC14443 Type B card compliant and NFC Phone emulating a card
  NFC-F: FeliCa Card and FeliCa Phone (e.g. F902iS from Fujitsu)

In the NFC mode, the device further listens for e.g. the following kinds of devices grouped by applied technology:
  NFC-A: reader device on top of a metro turnstile, point of sale NFC-A compliant device, NFC equipped mobile phone (e.g. Nokia 6131 NFC) and any ISO/IEC14443 Type A reader
  NFC-B: reader device on top of a metro turnstile, point of sale NFC-B compliant device, NFC equipped mobile phone (e.g. Nokia 6131 NFC) and any ISO/IEC14443 Type B reader
  NFC-F: reader device on top of a metro turnstile, point of sale NFC-F compliant device, NFC equipped mobile phone (e.g. Nokia 6131 NFC) and any FeliCa reader For example, the mode switch module supports one or more of the following cases:
  a device periodically performs a NFC polling/listening and a BCC polling/listening
  a device with an ongoing BCC communication periodically performs a NFC polling/listening
  a device with an ongoing NFC communication periodically performs a BCC polling/listening
  a device has both, NFC and BCC communication, ongoing A variety of state transition sequences between NFC and BCC polling/listening states is possible. For example, even if it is not depicted in FIG. 2, state transition sequences of NFC polling, BCC polling, NFC listening and BCC listening, or NFC listening, BCC polling, NFC polling and BCC listening etc. can occur.

During a polling phase, a status of a device, module or unit is periodically requested, whereby the status can be determined by hardware as well as software. During a listening phase, the respective device, module or unit waits for a polling request. If the respective device, module or unit receives such a polling request, it sends back an answer at least once.

The mode switch should equally share the time between the two modes, NFC and BCC, wherein
  $t_L$ is the time during which a device is in a NFC listening phase, and
  $t_P$ is the time during which a device is in a NFC polling phase.

The listening phase and the polling phase can occur alternatively. The listening phase and the polling phase may be equally long. It is also possible that either the listening phase or the polling phase is longer than the respective other phase. Further, the time of the polling phase and the listening phase of a first coupling mode, e.g. the NFC mode, can equal the time of the polling phase and the listening phase of a second coupling mode, e.g. the BCC mode. However, it is also possible that the phases of a mode individually or in sum are longer than the respective phases of another mode.

When a device is in a polling phase in the NFC mode, i.e. a state 24, it shall poll for one or more NFC technologies (NFC-B, NFC-F, NFC-A), i.e. states 24a, 24b and 24c, one after the other. To be fair, the mode switch module should not allow BCC to poll for more time than any other technology (e.g. NFC-A). Thus, $t_{BCCP}$ is defined as the time during which the device polls for other BCC devices. That is, $t_{BCCP}$ is defined as $$t_{BCCP} = t_P/n,$$

where n is the number of different technologies polled for during the NFC mode. This provides a good comfort level for all technologies.

When the device is in a listening phase in the NFC mode, i.e. a state 23, it shall detect any incoming RF-field, choose one specific technology, either state 23a, 23b or 23c, and then, if a polling request comes from this technology, send an answer. Thus, it will most probably listen for just one technology during one NFC listening phase.

Typical BCC applications like patient monitoring need the BCC devices to transmit vital signs very regularly and cannot support to wait three NFC listening phases before receiving information updates. Therefore, one listening phase will be dedicated to NFC technologies, and the next one will be dedicated to BCC alone. Thus, $t_{BCCL}$ is defined as the time during which the device listens for other BCC device transmissions. That is, $t_{BCCL}$ is defined as $$t_{BCCL} = t_L.$$

Based on that, the total time $t_{NFC\text{-}BCC}$ for a cycle where the NFC-BCC device polls and listens for NFC technologies and BCC can be defined as $$t_{NFC\text{-}BCC} = t_P + t_L + t_{BCCP} + t_{BCCL} = t_P + t_L + t_P/n + t_L = (n+1)t_P/n + 2t_L$$

In a polling phase in the BCC mode, i.e. a state 22, the device starts a timer of duration $t_{BCCP}$. Then, it sends a broadcast polling command BCC_POLL_REQ in a state 26 until the end of the timer. This is very different from the above describe NFC mode switch, because in the NFC mode the device will proceed to a sequence of polling for different technologies and have to wait for responses before changing the polled technology.

Here, the device in the BCC mode will collect answers as it continues to poll. There is no need for the polling device to let the channel free to collect responses, since the medium will be shared between the answering devices and the polling device via carrier sense multiple access/collision avoidance (CSMA/CA). Before sending a new polling request, a device will sense the channel as busy and will then collect answers. This choice is directly imposed by the mesh architecture of the network. Indeed, a BCC device should be able to communicate with any other BCC device at the same time and collect during one polling phase as much answers as possible, including BCC devices appearing during this specific polling phase. It reacts after the polling phase to each of the answers, depending on the needs of the applications running on the device. For each answer, it passes the received ID of the responding device to the application layer.

In a listening phase in the BCC mode, i.e. a state 21, the device starts a timer of duration $t_{BCCL}$. Then, it waits for a polling command BCC_POLL_REQ. If it receives such a request, it sends back an answer BCC_POLL_RES in a state 25. Although theoretically a device may just respond one time to a polling command, it can happen that the answer is lost because the polling device sends broadcast packets and does not send acknowledgements for received answers. Therefore, a device shall always respond to a polling command, even if it has already responded within the same listening phase. The polling device shall detect multiple responses from one specific device.

In addition to the here described 'generic mode switch', which automatically and transparently switches between the NFC mode and the BCC mode sharing the time equally, it is also possible to allow applications to explicitly switch between the NFC mode and the BCC mode. This allows switching in the most appropriate moments, depending on the application status. For this case, a number of messages can be defined, that may be used by the application.

In both cases, the mode switch module will have an internal representation of the communication status of its device, so that it can decide how to best switch between the NFC mode and the BCC mode without disturbing/degrading running applications/communication.

In the above described example, two coupling modes, i.e. the NFC mode and the BCC mode, are provided. However, it is also possible that more than two coupling modes are employed. Further, the employed coupling modes can be of the same type or of different types.

Figure 3:
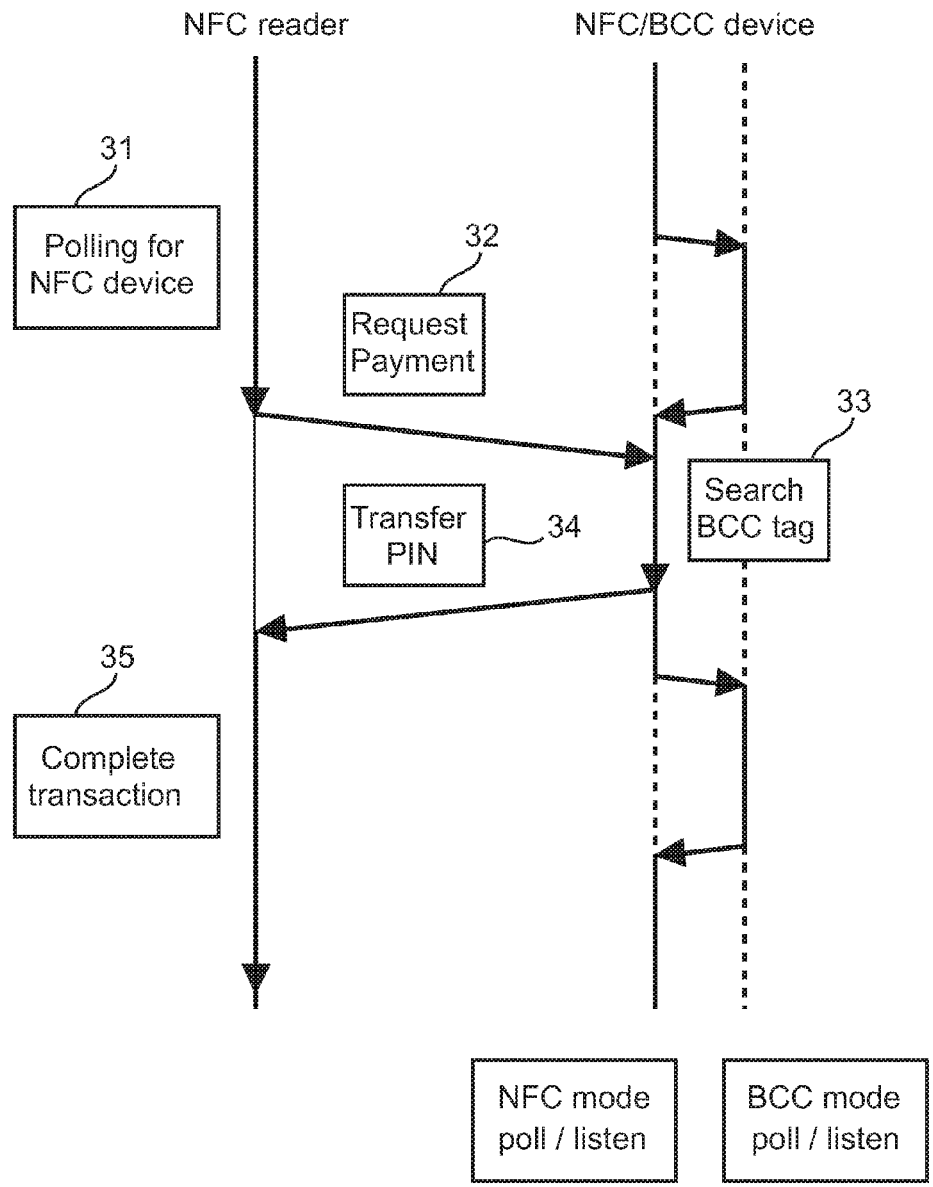
FIG. 3 shows a flowchart of an application in accordance with the embodiment.

FIG. 3 shows a flowchart of an application in accordance with the embodiment. A mobile phone being NFC and BCC capable can offer various applications. One among many applications offered by such a phone is the payment of transport tickets, concerts, cinema, theatre tickets (e.g. via a smart poster) or even any product in a shop equipped with an NFC reader, without a credit card. This type of application requires an authentication process at the moment of the payment in order to authenticate the buyer and the legal process of this payment. The transaction is started with NFC, and for authentication the mobile phone searches on the user body for a BCC tag containing a unique key, in order to identify this user. The unique key can then be transmitted via BCC to the NFC reader so as to authenticate the transaction.

In a state 31, the NFC reader regularly polls for NFC devices to process the payment. The NFC-BCC mobile phone alternates between NFC polling/listening and BCC polling/listening phases. When the NFC-BCC mobile phone is in the NFC listening phase, it will detect the request for payment from the NFC reader in a state 32. The NFC-BCC mobile phone will process the payment and will search for a BCC tag in a state 33 when the NFC reader will request a PIN code. The NFC-BCC mobile phone will then transfer the PIN code to the NFC reader in a state 34, to complete the transaction in a state 35.

It is noted that the proposed solution according to the above embodiment can be implemented in software modules at the relevant functional blocks. It is further noted that the present invention is not restricted to the above embodiment but can be used in any network environment. In particular, it can be applied to all NFC-based systems for mobile transactions and interactions with all kinds of wireless devices.

In the above description, the abbreviation "BCC" is used to denote a body coupled communication, and the abbreviation "NFC" is used to denote a near field communication. However, usage of these abbreviations is not to be interpreted in any restrictive way, for example such that a specific standard is to be employed. By contrast, any kind of body coupled communication and near field communication can be meant.

In summary, the invention relates to a device for transmitting in multiple coupling modes. The device comprises a transmission module, at least one periphery module, and an antenna for each of the multiple coupling modes. The invention also relates to a method of switching between multiple coupling modes, wherein switching is conducted between at least polling and listening phases of first and second coupling modes. The device and the method enable a seamless switching between e.g. a near field communication and a body coupled communication using the same hardware.

While the invention has been illustrated and described in detail in the drawings and foregoing description, such illustration and description are to be considered illustrative or exemplary and not restrictive. The invention is not limited to the disclosed embodiment.

Other variations to the disclosed embodiment can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage.

A computer program comprising program code means for causing a computer to carry out the steps of a method according to the embodiment may be stored/distributed on a suitable medium, such as an optical storage medium or a solid-state medium supplied together with or as part of other hardware, but may also be distributed in other forms, such as via the Internet or other wired or wireless telecommunication systems.

The invention claimed is:

1. A device for transmitting in multiple coupling modes, comprising:
   a transmission module,
   at least one periphery module, and a first antenna for a first coupling mode of the multiple coupling modes and a second antenna for a second coupling mode of the multiple coupling modes wherein switching between the first coupling mode and the second coupling mode is conducted between at least polling and listening phases of the first coupling mode and the second coupling mode, wherein a time of polling in said second coupling mode is determined based on a number of a plurality of technologies polled in said first coupling mode, wherein a search for information in said second coupling mode is initiated based on an action associated with said first coupling mode; and transmitting, through said first coupling mode, said information obtained in said second coupling mode.

2. The device according to claim 1, wherein the at least one periphery module comprises:
    a receiver circuit,
    a filter, and
    a matching module.

3. The device according to claim 2, wherein the matching module comprises at least one matching circuit for at least one of the multiple coupling modes.

4. The device according to claim 2, wherein the at least one periphery module is configured for each of the multiple coupling modes by comprising:
    a receiver circuit for each of the multiple coupling modes,
    a filter for each of the multiple coupling modes, and
    a matching circuit for each of the multiple coupling modes.

5. The device according to claim 1, wherein the first coupling mode is an inductive coupling mode, and the second coupling mode is a capacitive coupling mode.

6. The device according to claim 5, wherein the inductive coupling mode is used for near field communication, and the capacitive coupling mode is used for body coupled communication.

7. The device according to claim 1, wherein the transmission module and the at least one periphery module are integrated in a single module.

8. An apparatus comprising:
    a device comprising:
    a transmission module,
    at least one periphery module, and
    a first antenna for a first coupling mode of the multiple coupling modes and a second antenna for a second coupling mode of the multiple coupling modes wherein switching between the first coupling mode and the second coupling mode is conducted between at least polling and listening phases of the first coupling mode and the second coupling mode, wherein a time of polling in said second coupling mode being determined based on a number of a plurality of technologies polled in said first coupling mode, wherein a search for information in said second coupling mode is initiated based on an action associated with said first coupling mode; and transmitting, through said first coupling mode, said information obtained in said second coupling mode.

\* \* \* \* \*